(12) United States Patent
Boyd et al.

(10) Patent No.: US 11,717,919 B2
(45) Date of Patent: Aug. 8, 2023

(54) METHODS AND APPARATUS FOR ASSEMBLY OF MOMENT CONNECTION COMPONENTS

(71) Applicant: ConXtech, Inc., Pleasanton, CA (US)

(72) Inventors: John S. Boyd, Tiburon, CA (US); Kevin Marek, Hayward, CA (US); Eric Bellman, Hayward, CA (US); Maxwell C. Simmons, Hayward, CA (US); Robert J. Simmons, Hayward, CA (US); Brian Hood, San Francisco, CA (US)

(73) Assignee: ConXtech, Inc., Pleasanton, CA (US)

( * ) Notice: Subject to any disclaimer, the term of this patent is extended or adjusted under 35 U.S.C. 154(b) by 1183 days.

(21) Appl. No.: 16/271,751

(22) Filed: Feb. 8, 2019

(65) Prior Publication Data
US 2019/0247962 A1 Aug. 15, 2019

Related U.S. Application Data

(60) Provisional application No. 62/628,823, filed on Feb. 9, 2018, provisional application No. 62/628,807, filed on Feb. 9, 2018.

(51) Int. Cl.
*B23K 37/04* (2006.01)
*E04C 3/06* (2006.01)
(Continued)

(52) U.S. Cl.
CPC .......... *B23K 37/04* (2013.01); *B23K 37/0426* (2013.01); *B23K 37/0452* (2013.01);
(Continued)

(58) Field of Classification Search
CPC ... B23K 11/002; B23K 11/0935; B23K 11/36; B23K 11/3081; B23K 37/0443;
(Continued)

(56) References Cited

U.S. PATENT DOCUMENTS 2,878,703 A    3/1959   Easton
3,744,138 A    7/1973   Schuler
(Continued)

FOREIGN PATENT DOCUMENTS

CN    201664833 U    12/2010
CN    102672403 A    9/2012
(Continued)

OTHER PUBLICATIONS

UK Intellectual Property Office, Examination Report under Section 18(3) regarding UK Patent Application No. GB2014139.6, dated Mar. 4, 2022, 4 pages.
(Continued)

*Primary Examiner* — Phuong T Nguyen
(74) *Attorney, Agent, or Firm* — Kolisch Hartwell, P.C.

(57) ABSTRACT

A beam-end component welding fixture including a stand having a central horizontal axle mechanism and a housing. A handle is mounted on a first end portion of the axle mechanism and a rotatable plate structure is mounted on a second end portion of the axle mechanism. A column connecting simulator is attached to the plate structure and configured to support a beam-end component.

21 Claims, 7 Drawing Sheets

(51) Int. Cl.
*E04G 21/16* (2006.01)
*E04B 1/24* (2006.01)
*B23K 101/24* (2006.01)
*B23K 101/28* (2006.01)

(52) U.S. Cl.
CPC ............... *E04C 3/06* (2013.01); *E04G 21/16* (2013.01); *B23K 2101/24* (2018.08); *B23K 2101/28* (2018.08); *E04B 1/2403* (2013.01); *E04B 2001/2415* (2013.01)

(58) Field of Classification Search
CPC .............. B23K 9/0026; B23K 37/0435; B23K 2101/006; B23K 37/04; B23K 37/0536; B23K 9/0286; B23K 37/0533; B23K 9/0253; B23K 31/12; B23K 2101/28; B23K 37/0426; B23K 37/0452; B23K 2101/24
USPC .......... 219/101, 104, 136, 159, 148, 121.63, 219/124.22
See application file for complete search history.

(56) References Cited

U.S. PATENT DOCUMENTS

| | | | |
|---|---|---|---|
| 7,621,099 B2 | 11/2009 | Simmons | |
| 7,941,985 B2 | 5/2011 | Simmons | |
| 9,409,249 B1* | 8/2016 | Trussell | B23K 9/0286 |
| 2006/0049237 A1* | 3/2006 | Simmons | E04B 1/2403 228/212 |
| 2008/0174760 A1 | 7/2008 | Zhao | |
| 2008/0296353 A1* | 12/2008 | Simmons | B23K 37/0443 228/49.1 |
| 2010/0192346 A1 | 8/2010 | Simmons | |
| 2016/0332265 A1 | 11/2016 | Tsui et al. | |
| 2019/0202011 A1 | 7/2019 | Watkins | |

FOREIGN PATENT DOCUMENTS

| | | |
|---|---|---|
| CN | 102218617 B | 1/2014 |
| CN | 204221012 U | 3/2015 |
| GB | 2510158 A | 1/2013 |
| JP | H11-90686 A | 4/1999 |
| JP | 2000334598 A | 12/2000 |
| KR | 20090034566 A | 4/2009 |
| KR | 20150048345 A | 5/2015 |

OTHER PUBLICATIONS

European Patent Office, Extended European Search Report regarding European Patent Application No. 19751246.0, dated Dec. 7, 2021, 6 pages.

The International Bureau of WIPO, International Preliminary Report on Patentability regarding PCT Patent Application No. PCT/US2019/07376, dated Aug. 20, 2020, 10 pages.

U.S. Receiving Office of WIPO, International Search Report regarding PCT Patent Application No. PCT/US19/17376, dated Apr. 24, 2019, 10 pages.

U.S. Receiving Office of WIPO, Written Opinion of the International Searching Authority regarding PCT Patent Application No. PCT/US19/17376, dated Apr. 24, 2019, 8 pages.

U.S. Patent and Trademark Office, Non-Final Office Action regarding U.S. Appl. No. 16/270,573, dated Sep. 7, 2022, 22 pages.

UK Intellectual Property Office, Examination Report under Section 18(3) regarding UK Patent Application No. GB2014139.6, dated Dec. 2, 2022, 7 pages.

Japan Patent Office, Office Action regarding Japanese Patent Application No. 2020-542776, dated Jan. 17, 2023, 11 pages.

* cited by examiner

METHODS AND APPARATUS FOR ASSEMBLY OF MOMENT CONNECTION COMPONENTS

CROSS-REFERENCES

This application claims the benefit under 35 U.S.C. § 119(e) of the priority of U.S. Provisional Patent Application Ser. No. 62/628,823, filed Feb. 9, 2018, and of U.S. Provisional Patent Application Ser. No. 62/628,807, filed Feb. 9, 2018, the entireties of which are hereby incorporated by reference for all purposes. U.S. Pat. No. 7,941,985 B2 is also incorporated by reference herein, in its entirety, for all purposes.

INTRODUCTION

Full moment collar beam mounts offer a valuable improvement over on-site welding techniques for steel frame building construction. Welding can be done off site in controlled conditions, and connected beam mounts seat frame members in proper spatial orientation at a construction site.

U.S. Pat. No. 7,941,985 discloses an exemplary full moment collar beam mount, described as a halo/spider connection. A collar corner assembly is welded to each of the four corners of the column. At each face of the column, a flange sub-assembly of an upper flange and a lower flange connected by a web insert is received in a tapered channel formed between the collar corner assemblies at the adjacent corners. Where a beam and a column connect, the flange sub-assembly is welded to the end of the beam. Connections across all faces of the column together form a full moment collar.

The beam connections allow precise building frame construction, but also require precise manufacturing. Along the length of a building frame, many beam and column connections line up and tolerances or imprecisions from the connections may be added or multiplied. This can result in undesirable overall deviation from specifications. Manufacturing tools and methods are needed to facilitate precise positioning and welding of beam connection components in the manufacturing process.

An important part of a collar manufacturing process is the welding of collar flange assemblies to the ends of beams. The assembly and beam must be securely supported in a precise spatial configuration relative to one another during welding, and welding access must be made safely and easily available to workers.

SUMMARY

The present disclosure provides systems, apparatuses, and methods relating to beam-end component welding systems and fixtures. In some examples, a welding fixture may include a stand having a central horizontal axle mechanism and a housing. A handle may be mounted on a first end portion of the axle mechanism and a rotatable plate structure may be mounted on a second end portion of the axle mechanism. A column connecting simulator may be attached to the plate structure and configured to support a beam-end component.

In some examples, a welding system may include a base having a track, and first and second collar flange assembly welding fixtures slidably mounted on the track. Each welding fixture may include a stand having a central horizontal axle mechanism and a housing. A handle may be mounted on a first end of the axle mechanism and a rotatable plate structure may be mounted on a second end of the axle mechanism. A pair of collar corner simulators may be attached to the plate structure and configured to support a collar flange assembly.

In some examples, a method of welding a beam-end component to a beam may include positioning a first welding fixture a selected distance from a second welding fixture along a track. The method may further include mounting a rotatable plate structure to a first end of a horizontal axle mechanism of the first welding fixture and positioning a column connecting simulator on the rotatable plate structure. The method may further include engaging a beam-end component in the column connecting simulator and supporting a beam between the first and second welding fixtures such that an end of the beam is adjacent the beam-end component. The method may further include rotating the beam-end component and the beam with a handle mounted to a second end of the horizontal axle mechanism of each of the first and second welding fixtures and welding the beam-end component to the end of the beam.

Features, functions, and advantages may be achieved independently in various examples of the present disclosure, or may be combined in yet other examples, further details of which can be seen with reference to the following description and drawings.

DETAILED DESCRIPTION

Figure 1:
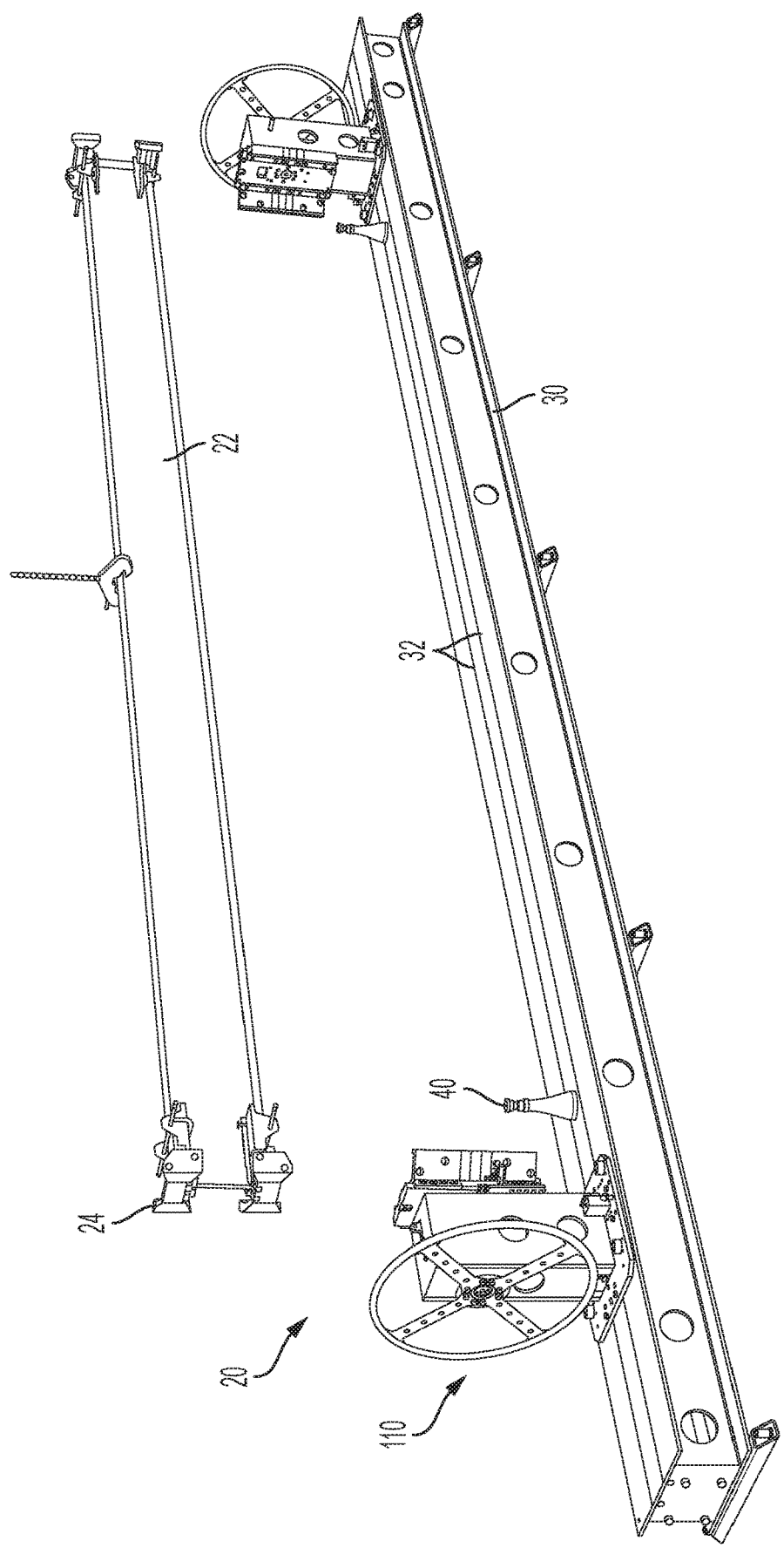
FIG. 1 is an isometric view of an illustrative beam mounting station in accordance with aspects of the present disclosure, including a beam with a collar flange assembly clamped on each end.

Various aspects and examples of a beam-end component welding system including a track and welding fixtures, are described below and illustrated in the associated drawings. Unless otherwise specified, a welding system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, a beam-end component welding system in accordance with the present teachings may include first and second welding fixtures and at least one beam support. The welding fixtures and beam support may be configured to cooperatively support a beam-end connection component and a beam in a precise spatial relationship, while welding or other operations are performed to temporarily or permanently fix the beam and component together in that spatial relationship.

Each welding fixture may include a support structure configured to support and secure a beam-end connection component. For example, one or both of the welding fixtures may include a collar flange assembly support structure configured to simulate a face of a column prepared for connection to a beam with a full moment collar. The welding fixture may thereby support a collar flange assembly or other connection component in a precise position and orientation. The welding fixtures may be configured to engage the same or different types of beam connectors.

Each welding fixture may include a stand having a housing and a horizontal axle mechanism, with a handle mounted on a first end of the axle mechanism. The support structure may be mounted to a second end of the axle mechanism. The support structure may rotate with the axle mechanism, in turn rotating a supported collar flange assembly and beam. Rotating the beam and flange assembly may allow access to different surfaces or portions of the connection component and beam for welding or other processes.

The welding fixtures and beam support may be mounted on an elongate base. The welding fixtures may be slidably mounted on a track of the base, and selectively securable at a discrete or continuous plurality of locations along the track. The beam support may be adjustable, allowing a vertical position of a supported beam to be adjusted relative to the welding fixtures and/or allowing beams of different depths to be supported at an appropriate position relative to the welding fixtures. The beam support may also be removable, collapsible, or adjustable to a sufficiently small height so as to provide clearance for rotation of the beam.

The welding system may be configured to facilitate precise spacing of the two welding fixtures. For example, one or both of the welding fixtures may include a laser distance finding tool. For another example, the base may include guide markings for discrete locations along the track corresponding to selected fixture spacings.

Examples, Components, and Alternatives

The following sections describe selected aspects of exemplary welding systems as well as related apparatus and/or methods. The examples in these sections are intended for illustration and should not be interpreted as limiting the entire scope of the present disclosure. Each section may include one or more distinct examples, and/or contextual or related information, function, and/or structure.

A. Illustrative Beam Mounting Station

As shown in FIGS. 1-8, this section describes an illustrative collar flange assembly beam mounting station 20. Station 20 is an example of a beam-end component welding system, described above.

FIG. 1 shows an I-beam 22 being loaded into station 20. A collar flange assembly 24 is clamped to each end of beam 22, which is supported by a crane over the beam mounting station. Station 20 includes two rotators 110 slidably mounted on a base 30. Proximate each of the rotators, an adjustable beam support 40 is attached to the base. In the illustrated example, the support is a screw jack.

Rotators 110 are slidably mounted in a pair of tracks 32 of base 30. One ore both of the rotators may be adjusted along the tracks, to achieve a precise spacing between the rotators. The spacing may correspond to a desired total length of a beam and connected collar flange assemblies. Features allowing precise location of the rotators on the track and relative to one another may be included in the beam mounting station. For example, guide markings may be included on the base and/or laser distance measuring equipment may be included on the rotators. The rotators may be selectively securable at a discrete or continuous plurality of locations along the tracks. For example, one or more fasteners such as pins may be used to secure a rotator to apertures in the base and/or clamping bolts of the rotators may frictionally engage the track.

To load beam 22 into the beam mounting station, the beam may be lowered such that each collar flange assembly 24 is received by a rotator 110 and the beam rests on adjustable supports 40. The clamps securing collar flange assemblies 24 to the beam may be removed and/or loosened, allowing adjustments in the vertical position of the beam relative to the collar flange assemblies. Adjustable supports 40 may be used to achieve a desired vertical position of the beam.

The beam mounting station may support beam 22 and collar flange assemblies 24 in a precise spatial relationship, while the collar flange assemblies are being connected to the beam. The rotators may maintain the components in this precise spatial relationship while rotating the beam to provide access to different surfaces or parts of the collar flange assemblies and beam for welding or other connection processes.

Figure 2:
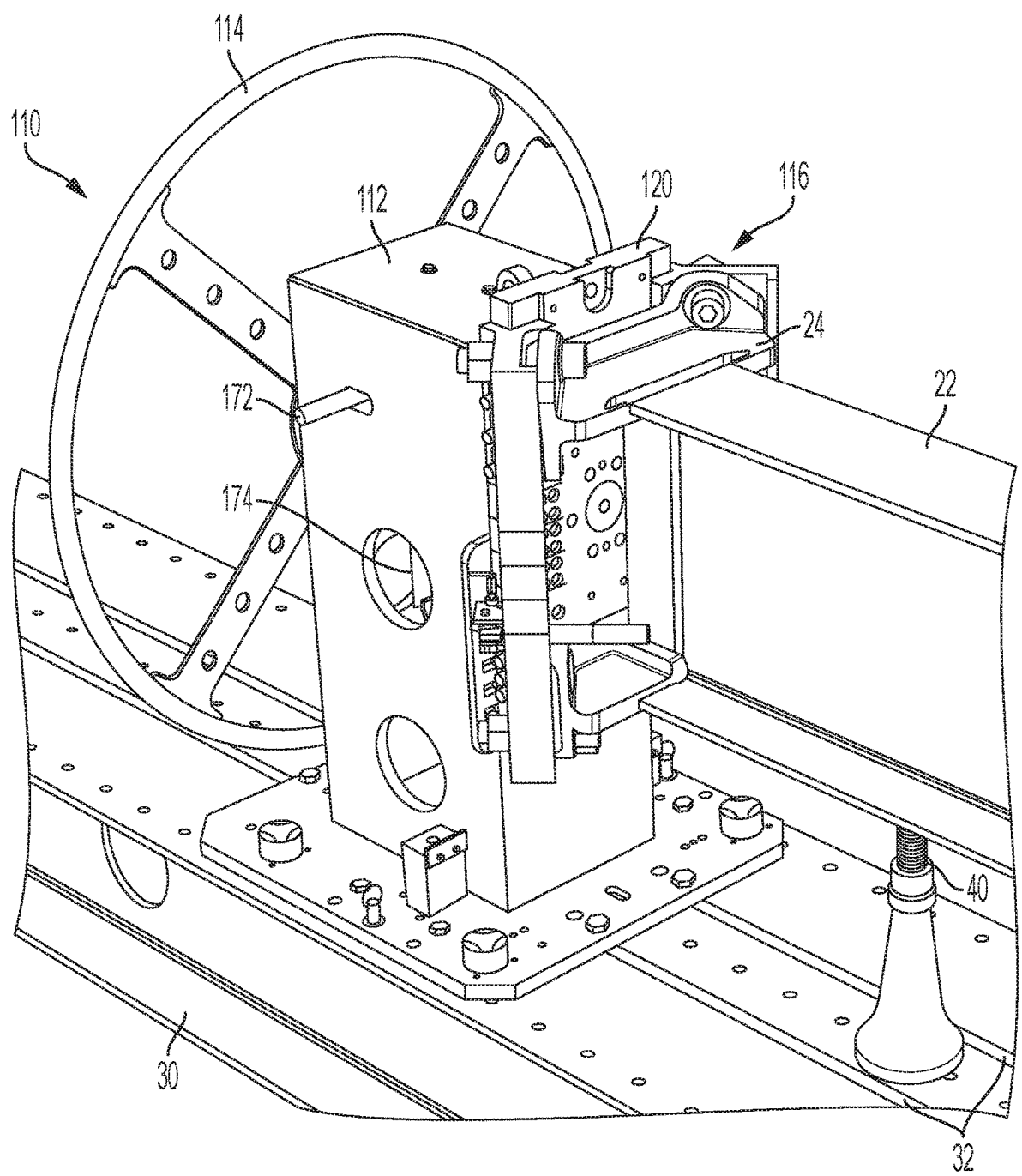
FIG. 2 is an isometric view of a rotator of the beam mounting station of FIG. 1, with one of the collar flange assemblies secured.

In general terms, each rotator is configured to mimic one face of a column prepared for connection to a beam. FIG. 2 shows one of collar flange assemblies 24 received by a rotator 110. Collar flange assembly 24 is supported by a flange support 116, mounted to a front side of a stand 112. The adjacent end of beam 22 is supported by adjustable support 40. The collar flange assembly has been bolted to the flange support, to secure the assembly in any orientation. Any number or type of fastener may be used, but in the illustrated example one bolt at each of four corners of the collar flange assembly is sufficient to secure the assembly.

A circular handle 114 at a back side of stand 112 allows manual rotation of flange support 116 and the secured collar flange assembly. Once collar flange assembly 24 has been tack welded to beam 22, the beam may also be rotated by use of handle 114. Handle 114 may be disposed anywhere on rotator 110, but locating the handle at the opposite side of the stand from the supported beam may improve safety of a user when rotating a heavy beam.

A bar handle 172 protrudes from the sides of stand 112. Handle 172 may control rotation of the flange support, either allowing rotation or securing the flange support to stabilize the supported collar flange assembly for welding or other operations. Circular handle 114, bar handle 172, and a grounding system 174 may all be accessible from either side of rotator 110. During operation, with a beam loaded, moving from one side of the rotator to the other may be prohibitively time consuming or dangerous. Access at either side may allow a worker use of all functions of the rotator without changing sides.

Rotator 110, and/or beam support 40 may be removable from base 30. Beam support 40 may be collapsed and/or removed once beam 22 has been tack welded to collar flange assembly 24, to allow free rotation of the beam. Rotator 110 may be removed for service, repairs, component upgrades, or exchange with another type of rotator.

Figure 3:
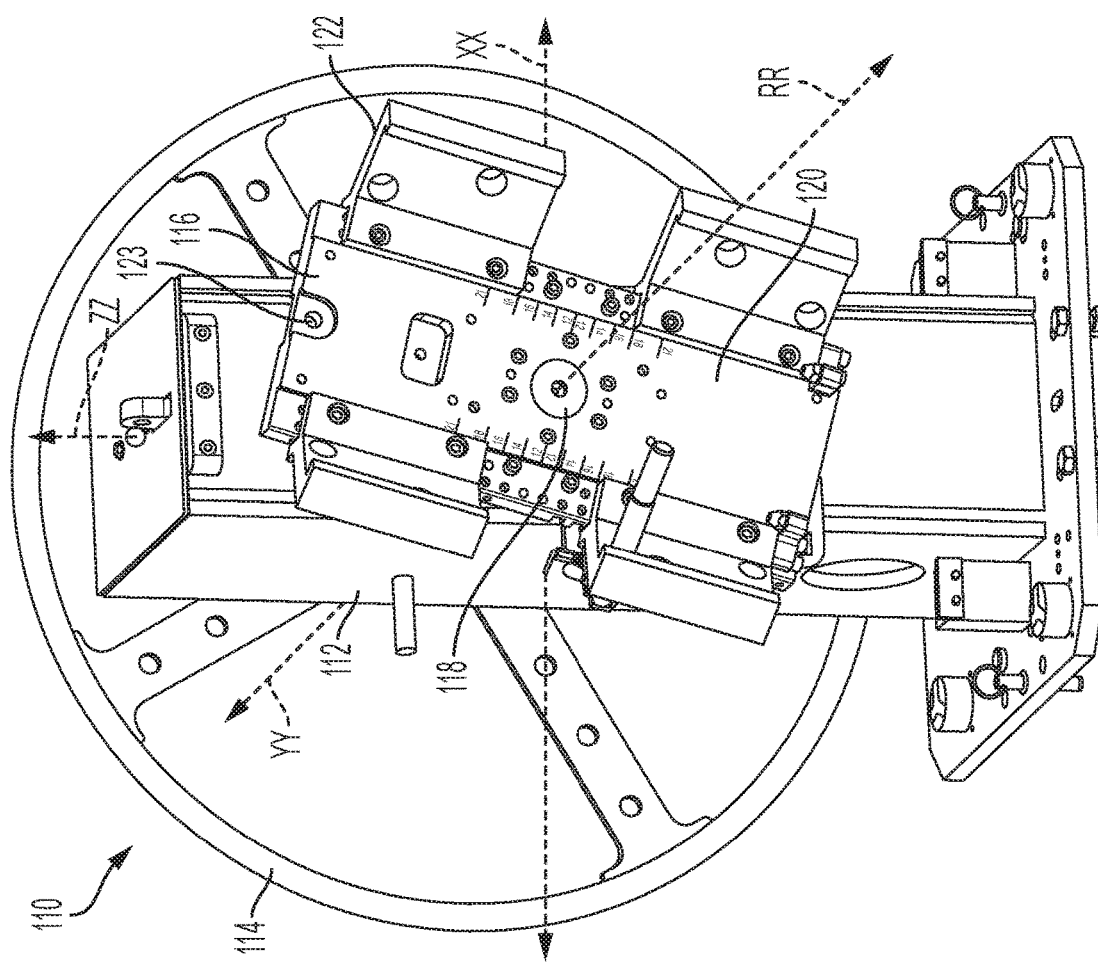
FIG. 3 is an isometric view of the rotator of FIG. 2.

In FIG. 3, rotator 110 is shown separate from the station. Flange support 116 is mounted at a first end of a central axle 118 of stand 112, such that the support may rotate relative to the stand. Handle 114 is mounted at a second end of the central axle, allowing manual rotation of flange support 116. The central axle defines an axis of rotation RR, about which both handle 114 and flange support 116 rotate.

Rotator 110 can be described in terms of an X-axis, a Y-axis, and a Z-axis, generally indicated at XX, YY, and ZZ, respectively. The Y-axis is a horizontal axis coinciding with axis of rotation RR of central axle 118. The Z-axis is a vertical axis perpendicular to the central axle. The X-axis is a horizontal axis perpendicular to the central axle.

In the pictured example, handle 114 is a steering wheel disposed on an opposite side of stand 112 from flange support 116. The size of handle 114 may allow mechanical advantage when rotating heaving beams, and the location may improve operator safety. In other examples, handles of any effective size or shape may be mounted at any point on the stand or flange support that does not impede use of rotator 110, or flange support 116 may be rotated by other means such as electrical controls housed in the stand.

Flange support 116 is configured to support various sizes of a collar flange assembly for a particular full-moment collar. Rotator 110 or station 20 may include one or more additional and/or alternative support structures and/or adaptors configured to simulate different collars, configured to support other collar components, and/or configured to support any beam-end components requiring welding. An appropriate one of the support structures may be fastened to central axle 118 prior to loading of a beam and beam-end components. In the present example, flange support 116 includes a faceplate 120 to which two collar corner simulators 122 are attached. Together the two collar corner simulators positioned on faceplate 120 form a tapered channel configured to receive a collar flange assembly.

Figure 4:
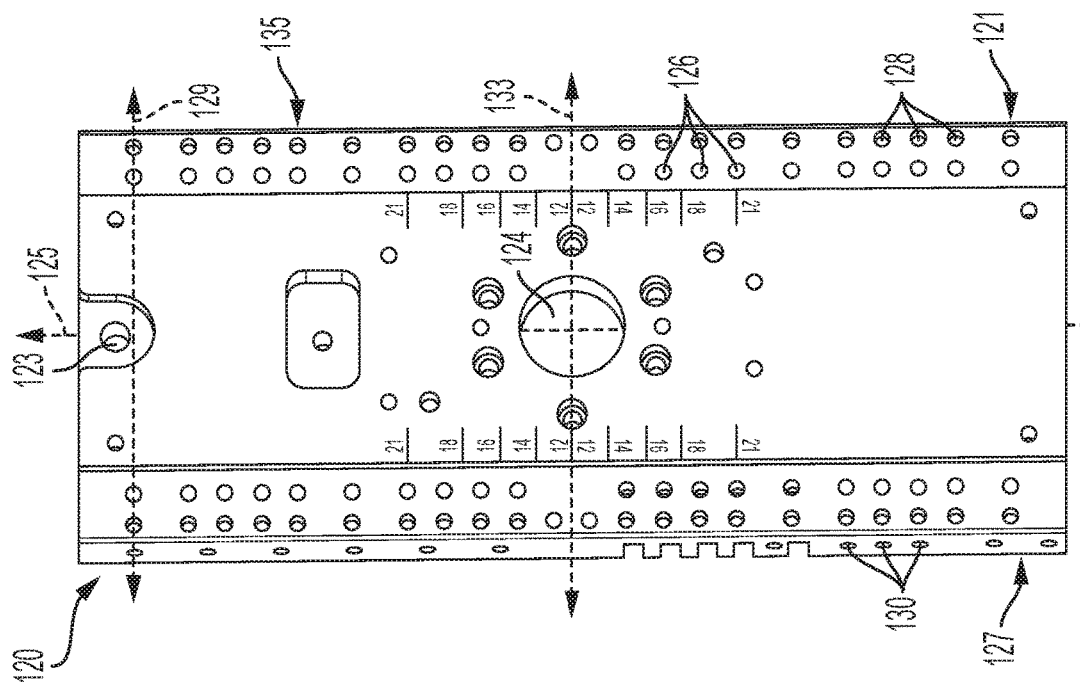
FIG. 4 is an isometric front view of the faceplate of the rotator of FIG. 2.

FIG. 4 shows a more detailed view of faceplate 120, which is generally rectangular in shape, with a central aperture 124 sized to receive the central axle of the stand. The faceplate has a front face 121, a back face 127, and opposing side edges 131. The back face may be generally planar, while the front face is recessed along two opposing sides to partially mate with and guide correct placement of the collar corner simulators. The faceplate has a center line 133 and a longitudinal axis 125.

When flange support 116 is mounted to stand 112, as shown in FIGS. 2 and 3, faceplate 120 is oriented so that the front face is perpendicular to central axle 118 and the axis of rotation RR. The faceplate may be described as having a central axis aligned with central axle 118. Faceplate 120 rotates in a plane parallel to the front and back faces of the plate.

The orientation of faceplate 120 may also be described in terms of the X-axis, Y-axis, and Z-axis of rotator 110. When mounted to central axle 118, longitudinal axis 125 of faceplate 120 is parallel to the Z-axis, and center line 133 is parallel to the X-axis. The faceplate rotates in a plane parallel to the X-Z plane. Features of flange support 116 may be described as having an X-axis, Y-axis, or Z-axis location in the context of an upright position of faceplate 120 as shown in FIG. 2.

A lifting point, or connector may also be also included in faceplate 120. In the present example, an aperture 123 is formed at a top end of the plate, suitable for connection to a lifting device such as a crane. Flange support 116 may be thereby lifted into place for fastening to central axle 118 and/or removed from the axle and exchanged for another type of plate or support, allowing rotator 110 to be used for connection of a variety of beam mount components.

Referring again to FIG. 4, faceplate 120 includes an array 135 of circular and elongate apertures for securing the collar corner simulators to the faceplate. A first plurality of circular threaded apertures 126 extending into the front face of faceplate 120 are arranged in two parallel lines. The lines of apertures 126 are symmetrically disposed, each line being proximate a side edge 131 of the faceplate. A plurality of laterally elongate slots 128 in front face 121 of faceplate 120 are similarly arranged in two parallel lines, each line proximate a side edge 131 of the faceplate. Each line of circular or elongate apertures is parallel longitudinal axis 125 of faceplate 120. Each elongate slot 128 defines a lateral axis 129, which is perpendicular to longitudinal axis 125 of faceplate 120.

A second plurality of circular threaded apertures 130 extend orthogonal to the first plurality of threaded apertures, into side edges 131 of faceplate 120. Apertures 130 are arranged in a line parallel to longitudinal axis 125 on each of the side edges. Each plurality of apertures 126, 128, 130 is located to correspond with features of the collar corner simulators, as described further below. In general, any or all apertures may be threaded or shaped to mate with any type of fasteners. Any number of apertures may be included in faceplate 120, arranged in any manner appropriate for connection of collar corner simulators.

Faceplate 120 is configured to allow connection of multiple configurations of the collar corner simulators. That is, each collar corner simulator may connect to a different subset of array of apertures 135 depending on the present configuration. Faceplate 120 includes a plurality of guide markings on front face 121, which indicate correct placement of the collar corner simulators for each configuration. Each configuration may correspond to a collar flange assembly length. The simulators may be symmetrical relative to center line 133 in each configuration, and the guide markings are accordingly mirrored over the center line.

In some examples, faceplate 120 may be configured to allow connection of multiple types of simulators and/or adaptors. For instance, faceplate 120 may include additional apertures located to allow a gravity catch simulator to be fastened to the faceplate.

Figure 5:
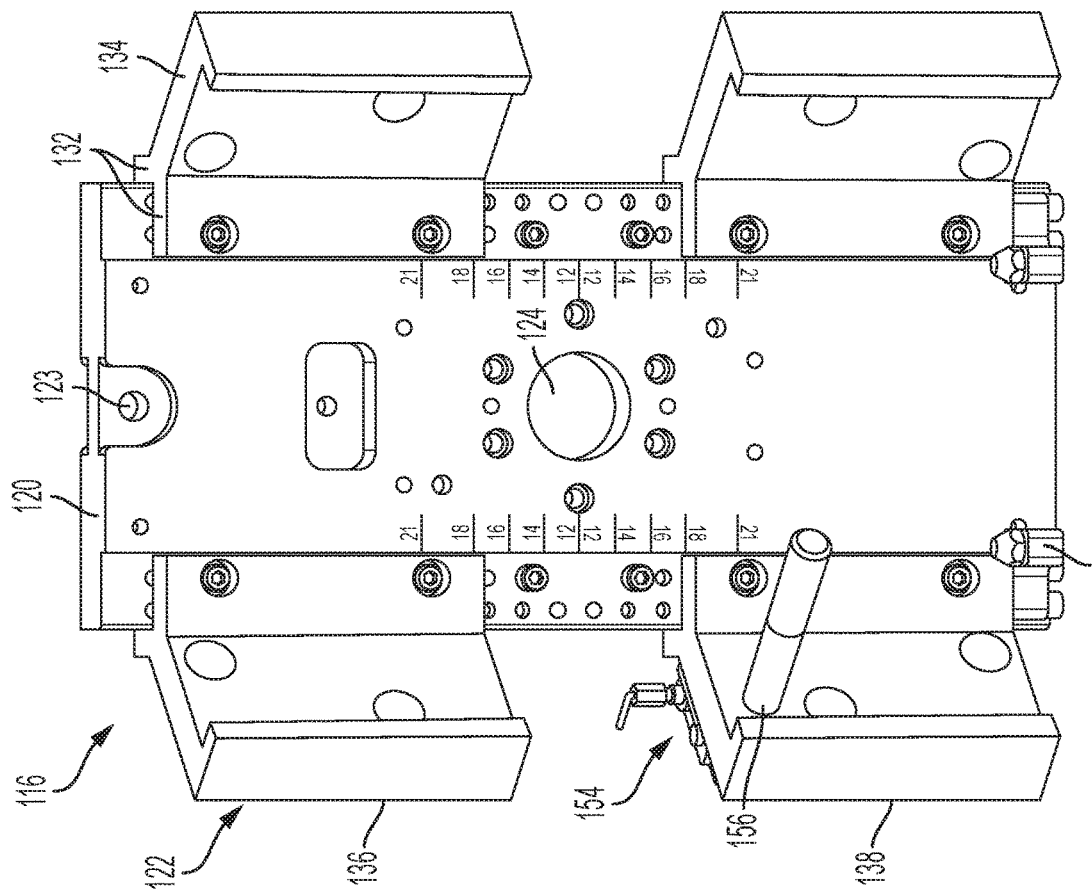
FIG. 5 is an isometric front view of the support assembly of the rotator of FIG. 2.

FIG. 5 shows flange support 116 with collar corner simulators 122 attached to faceplate 120. Each collar corner simulator 122 includes a top section 136 and a bottom section 138. The flange support may be configured for different lengths of collar flange assembly by the vertical placement of the top and bottom sections. Top section 136 and bottom section 138 may be connected to the faceplate according to the guide markings of the faceplate.

In some examples, a middle section may also be included between top section 136 and bottom section 138. The same top section 136 and bottom section 138 may be used in all configurations, while middle sections with different lengths or multiple middle sections may be used for different configurations.

Each collar corner has two protrusions or feet 132, extending orthogonal to one another and configured to lay flat against the front face and an adjacent edge of faceplate 120. In other words, the two feet straddle and closely conform to a corner of the faceplate. The two feet may be of the same or differing lengths or thicknesses. An L-shaped main body 134 extends from the intersection of the feet, at an angle parallel to a bisector of the right angle formed between the two feet. That is, an angle of approximately 135 degrees is formed between main body 134 and each of feet 132. In some examples, main body 134 may have a rectangular shape as discussed with reference to FIG. 6, below.

At a bottom end of collar corner simulator 122, a stop structure 158 is mounted. The stop structure simulates the alignment structure formed on collar corner assemblies of a full moment collar. Stop structure 158 is adjustably fastened to forward foot 132 of bottom section 138 of each collar corner simulator 122. The stop structure includes a planar upper surface and sloped or curved side surfaces, configured to contact a complementary bottom surface of a bottom flange member.

Stop structure 158 serves as a gravity catch, supporting the bottom flange of the collar flange assembly, and precisely locating the bottom flange in the vertical direction. The stop structure may also serve to guide the bottom flange into a correct lateral position, precisely locating the bottom flange along the X-axis. In some examples, the stop structures may include optional shims, to create a gap appropriate to accommodate a galvanized collar flange assembly.

Top section 136 and bottom section 138 are each gradually tapered from top to bottom, to receive the tapered shape of a collar flange assembly. If included, a middle section may be a consistent width, matching the narrowest end of top section 136 and the widest end of bottom section 138 such that the three pieces line up to form a smooth channel without projections. Top section 136 and bottom section 138 each have a pair of bolt holes, sized and positioned to correspond to bolt holes of a collar corner of a collar beam mount and to align with bolt holes of a collar flange assembly.

Figure 6:
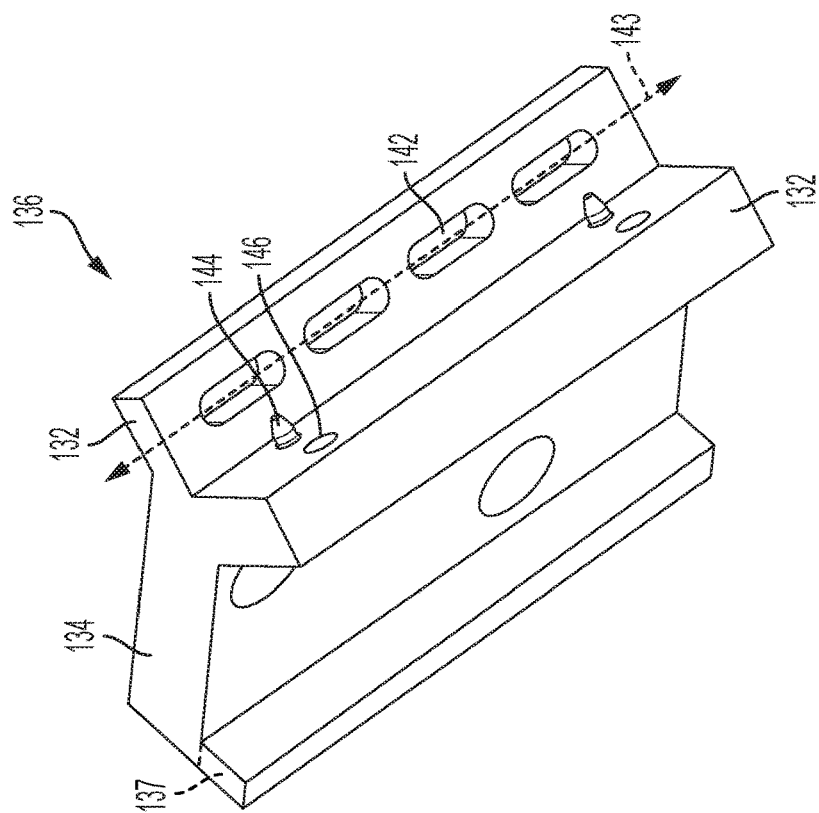
FIG. 6 is an isometric view of the top section of a collar corner simulator of the support assembly of FIG. 5.

FIG. 6 shows interior surfaces of feet 132 of a top section 136 of a collar corner simulator. Bottom section 138 may be similarly configured. A first foot includes a plurality of vertically elongate apertures 142 arranged to align with a subset of apertures 130 of faceplate 120 (see FIG. 4). The extent of the apertures may define an axis 143, which is perpendicular to longitudinal axis 125 of faceplate 120. The extended elongate shape of aperture 142 may allow the apertures to align with the same subset of apertures 130 in multiple configurations, reducing the number of apertures 130 needed. The second foot includes two pairs of a pin 144 and a circular aperture 146. Each pin 144 is positioned to align with a slot 128 and each circular aperture 146 is positioned to align with a threaded aperture 126 of faceplate 120 (see FIG. 4).

To connect the collar corner simulators to the faceplate, each section may be positioned proximate apertures and slots of the faceplate corresponding to a desired configuration of the flange support structure. Each pin 144 may be inserted into corresponding one of a selected subset of the plurality of slots 128 of the faceplate. The selected slots may correspond to a desired configuration and may be selected using the guide markings on front face 121. The pins may precisely locate the simulator section relative to the faceplate in the vertical direction or along the Z-axis, without constraining the simulator section in the horizontal plane.

A bolt may be inserted through each elongate aperture 142 and threaded into a corresponding one of a selected subset of the plurality of apertures 126 of the faceplate. The selected apertures may correspond to a desired configuration and may be selected using the guide markings on front face 121. These bolts may precisely locate the section of the collar corner relative to the faceplate in a first horizontal direction or along the Y-axis, without further constraining the simulator section along the Z-axis. These bolts may be left loose temporarily to avoid constraining the simulator section in the second horizontal direction, or along the X-axis.

A bolt may be inserted through each circular aperture 146 and threaded into a corresponding one of a selected subset of the plurality of apertures 130 of the faceplate. The selected apertures may correspond to a desired configuration and may be selected using the guide markings on front face 121. These bolts may be tightened to precisely locate the section of the collar corner relative to the faceplate along the X-axis. The bolts inserted through apertures 142 may then also be tightened. In other examples, other sequences of fastening may be used. Any effective method of connecting the collar corner simulator to the faceplate precisely without over-constraint may be used.

Also shown in FIG. 6 is a leg portion 137 of main body portion 134. In some examples, leg portion 137 may be removable. When removed, main body 134 may have a rectangular shape. In some examples, leg portion 137 may be omitted and collar corner simulators 122 may only include a rectangular main body, without a removable portion. Removing leg portion 137 or omitting the leg portion from main body portion 134 may help to prevent wedging or jamming of components in the collar corner simulator. When a completed beam is removed from the welding system, an overhead crane may damage the flange support and/or rotators if the collar flange assembly becomes mis-aligned and therefore trapped by the simulators.

In some examples, leg portion 137 may be designed to fail. That is, the leg portion may be designed to break away when subjected to a selected level of force. Such a break-away design may allow leg portion 137 to guide correctly aligned collar flange assemblies, but limit damage resulting from mis-aligned or jammed assemblies to the collar corner simulators.

Referring again to FIG. 5, flange support structure 116 also includes a safety latch 154, with a safety key 156. The latch is mounted on bottom section 138 of one of collar corner simulators 122, with key 156 extending through the section to engage the latch mechanism. Mounting the safety latch on the collar corner simulator may allow use of the same latch for multiple sizes of collar flange assembly.

Safety key 156 is positioned to prevent removal of a loaded collar flange assembly and is sufficiently strong to support the full weight of the collar flange assembly and at least approximately half the weight of the beam. If flange support structure 116 were to be inadvertently turned upside-down without flange bolts in place, the safety key would support and retain the collar flange assembly in the flange support structure and thereby hold up a connected beam. Removal of the safety key may engage the safety latch. Engagement of the latch may prevent rotation of flange support structure 116. This may ensure that the key is in place when flange support structure is not upright. Safety latch 154 is described in further detail with reference to FIG. 8, below.

Figure 7:
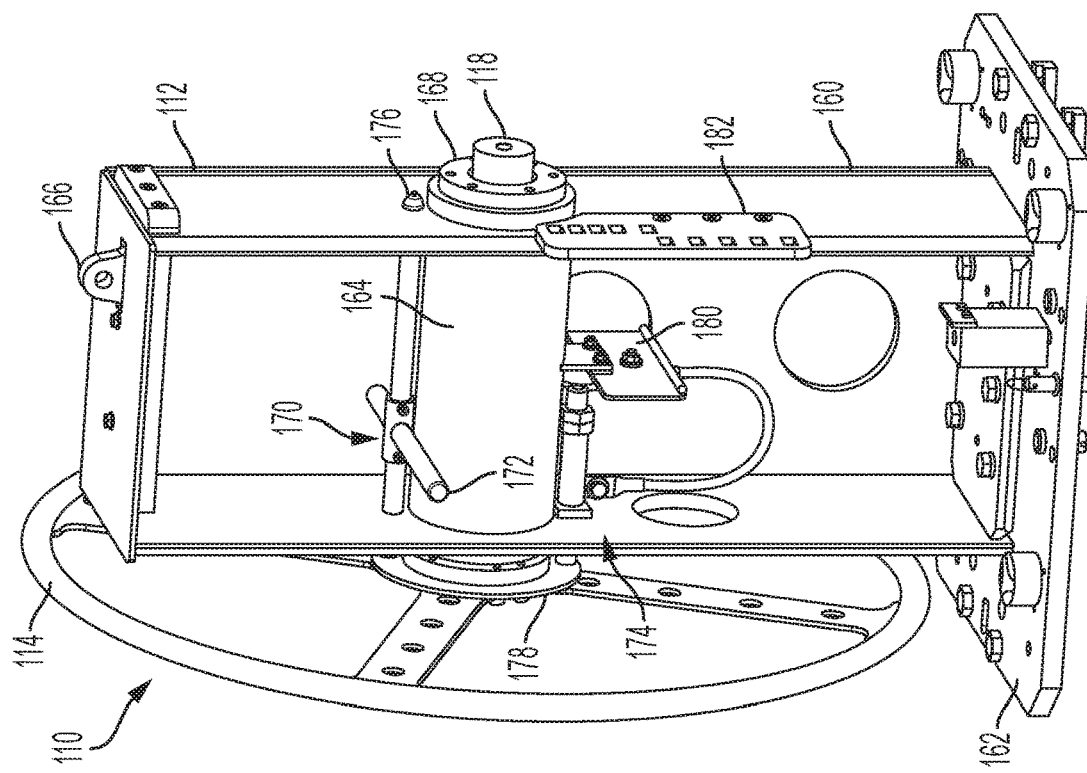
FIG. 7 is an isometric view of the stand of the rotator of FIG. 2, with one panel of the main housing omitted.

FIG. 7 shows rotator 110 without flange support structure 116. Other support structures may be mounted to stand 112 and the rotator may be used in connection of other structures to a beam, or as part of other manufacturing processes. Stand 112 includes a rectangular main housing 160 composed of 5 panels and attached to a base plate 162. The base plate is configured to engage a track of a beam mounting station, and may include features for precision location of the stand relative to the track or to another rotator.

An axle housing 164 extends through main housing 160, concentric about central axle 118. Collar bearings may be mounted within the axle housing at first and second ends of the housing, allowing the central axle to rotate freely within the housing. The housing may be fixed relative to main housing 160.

A lifting point 166 is mounted to a top panel of main housing 160. The lifting point includes a main extent that is bolted to an underside of the top panel, and disposed inside the main housing. A protrusion with an aperture extends through the top panel, to be accessible from outside the housing. A crane or other lifting device may be attached to lifting point 166 to transport the rotator. This geometry may allow the load of the rotator to be distributed for safe transportation. As shown in FIG. 7, the aperture is also located forward of a center of the main extent of the lifting point. This may counteract effects of unevenly distributed weight in the rotator, allowing the rotator to hang generally vertically or straight down from a crane.

Stand 112 includes a bumper 168, mounted to axle housing 164 and encircling central axle 118. In some examples, the bumper may be mounted to an external surface of main housing 160 between the housing and faceplate 120. In some examples, the bumper may be mounted to faceplate 120 and/or to central axle 118 and may rotate with flange support 116. Bumper 168 may be comprised of a deformable or disposable material. In situations where accident or misuse causes excessive force to be applied to the flange support, the bumper may be deformed rather than the support or the central axle. If the faceplate of the flange support becomes warped due to use or environmental factors, the bumper may rub or stick against the housing or the faceplate and indicate malformation not otherwise visible to a user of the rotator.

Rotator 110 has a secured mode and a rotatable mode. Stand 112 includes manually operable rotation release 170, used to transition the rotator between secured and rotatable modes. The secured mode may allow for stable loading, unloading, and/or welding, between rotations. In some examples, the rotational mechanism supporting central axle 118 may further include a rotation stop, preventing rotation past a predetermined range. Any effective mechanism may be used to secure the rotator.

In the present example, rotation release 170 includes two handles 172, which extend laterally from a central bar 176. The handles extend through side panels of main housing 160, to allow manual operation of rotation release 170 from either side of stand 112. This may be advantageous, as movement from one side of the rotator to another may be inconvenient or dangerous due to the presence of a supported beam and beam connection station track.

Central bar 176 of rotation release 170 may be slidably mounted in main housing 160 of stand 112. That is, handles 172 may be used to slide the central bar forward and back, parallel to central axle 118 and within a limited range of motion. At a furthest forward extent, the central bar may extend into a recess on the back face of the faceplate of the flange support. Engagement between the central bar and the faceplate may prevent rotation of the flange support relative to stand 112. This position of the central bar may be described as the secured mode of rotator 110. A shown in FIG. 8, multiple recesses 173 may be disposed on the back face of faceplate 120, allowing rotator 110 to be secured with the flange support in a plurality of orientations.

At a furthest rearward extent, the central bar may not engage the flange support. The central bar may also not engage handle 114, allowing the flange support to rotate. This position may be described as the rotatable mode of the rotator.

Returning to FIG. 7, stand 112 also includes a grounding system 174. In the present example, the system comprises a ring 178 of conductive material mounted to central axle 118, and a conductive bar mounted to axle housing 164 that remains in contact with the ring through rotation of the central axle. The conductive bar is electrically connected to a grounding plate 180, which is accessible from either side of main housing 160 through apertures in the housing. The grounding plate and conductive bar are mounted to axle housing 164, but not in electrical communication with the housing. A ground wire or lead may be connected to grounding plate 180 during welding, allowing resultant voltage in central axle 118 to ground safely, without damaging bearings of the stand.

Figure 8:
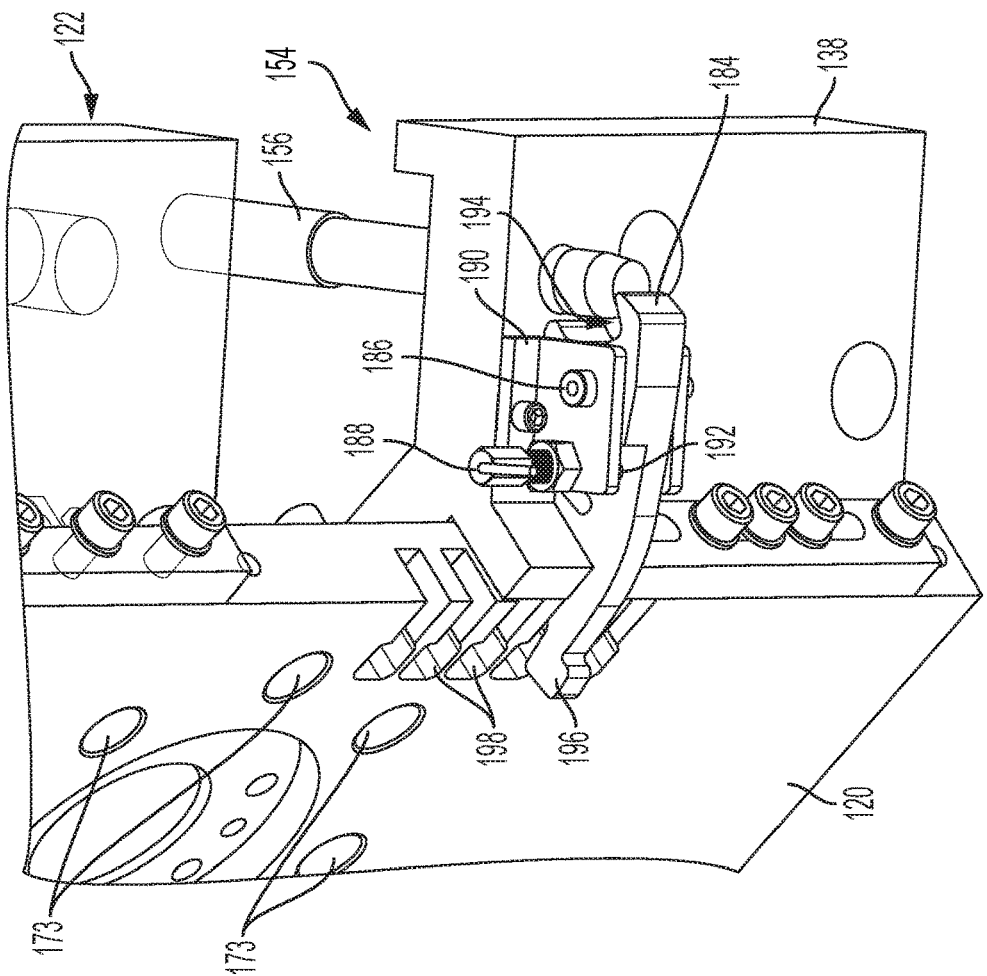
FIG. 8 is an isometric rear view of the safety latch of the rotator of FIG. 2.

FIG. 8 shows a rear view of a portion of flange support 116, including safety latch 154. The safety latch is configured to interface with latch plate 182, which is included in stand 112, and can be seen in FIG. 7. Safety latch 154 includes an arm 184 which is pivotable about a bolt 186. The bolt and a release pin 188 are mounted on a bracket 190. Release pin 188 extends into a hole 192 in arm 184, to selectively prevent the arm from pivoting. A user may lift up the release pin to allow arm 184 to pivot, and the release pin may be biased to return toward arm 184. At a first end, arm 184 includes a recess 194. At a second end, arm 184 includes a tab 196. Recess 194 is shaped to engage safety key 156, and tab 196 is sized to engage a slot in the latch plate. Arm 184 is sized to engage a slot 198 in back face 127 of faceplate 120.

Bracket 190 is mounted to bottom section 138 of collar corner simulator 122. Consequently, bracket 190 and arm 184 of safety latch 154 can be positioned at varying heights relative to the latch plate, depending on the configuration of collar corner simulator 122. Accordingly, the latch plate 182 includes a plurality of slots and faceplate 120 includes a plurality of slots 198, corresponding to each of the possible configurations of collar corner simulator 122. In some examples, the latch plate may include additional slots positioned to engage the safety latches of other support assemblies.

The position of safety latch 154 depicted in FIG. 8 may be referred to as an unlatched or disengaged position. A position of the safety latch in which tab 196 is received in a slot of the latch plate may be referred to as a latched or engaged position. In the unlatched position, release pin 188 is aligned with hole 192 in arm 184, and may extend into the hole, thereby preventing pivoting of the arm. Recess 194 engages safety key 156 and prevents removal of the key unless arm 184 is able to pivot. To transition safety latch 154 from the unlatched to the latched position, a user may lift release pin 188 and remove safety key 156.

In the latched position, tab 196 engages the latch plate and prevents rotation of the support assembly. Arm 184 is spring-biased to pivot to the latched position, unless prevented by release pin 188. To return safety latch 154 from the latched to the unlatched position, a user may insert safety key 156. Insertion of the safety key may pivot arm 184 such that release pin 188 aligns with hole 192 and extends into the hole.

B. Illustrative Rotator

Figure 10:
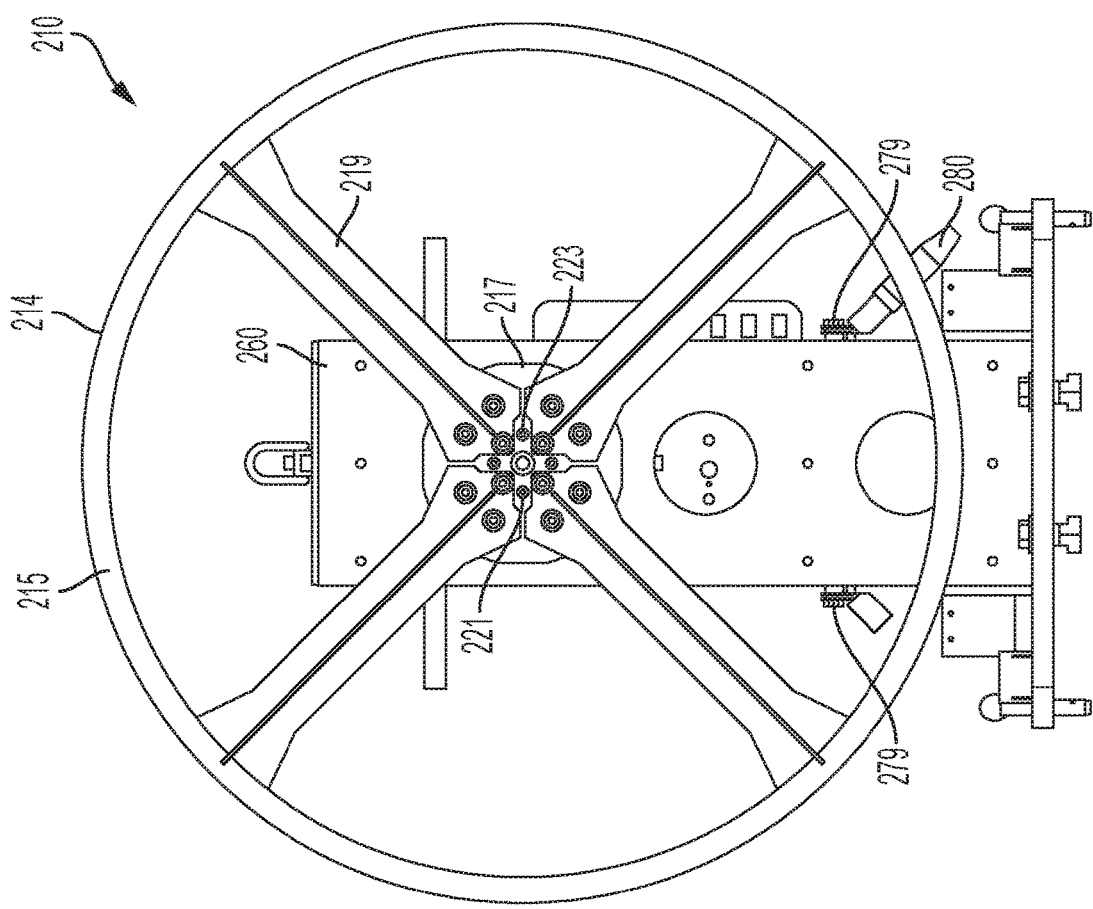
FIG. 10 is a rear plan view of the rotator of FIG. 9.
Figure 9:
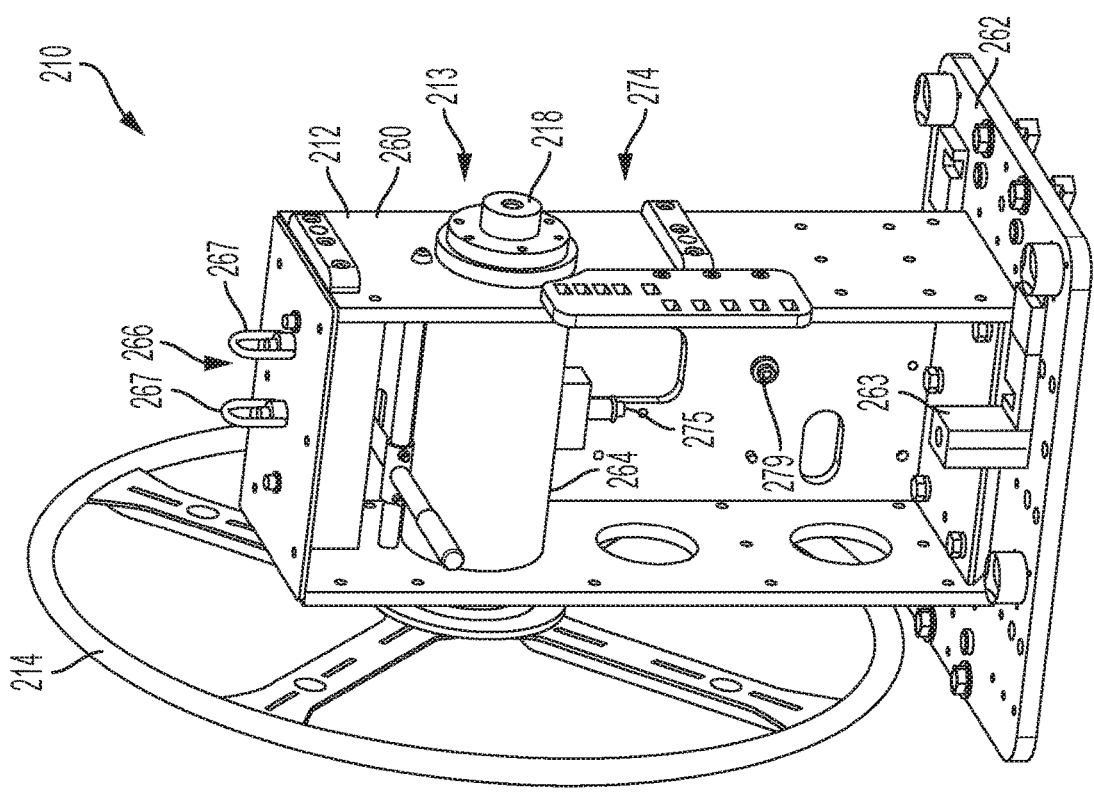
FIG. 9 is an isometric view of another illustrative rotator, with one panel of the main housing omitted.
Figure 11:
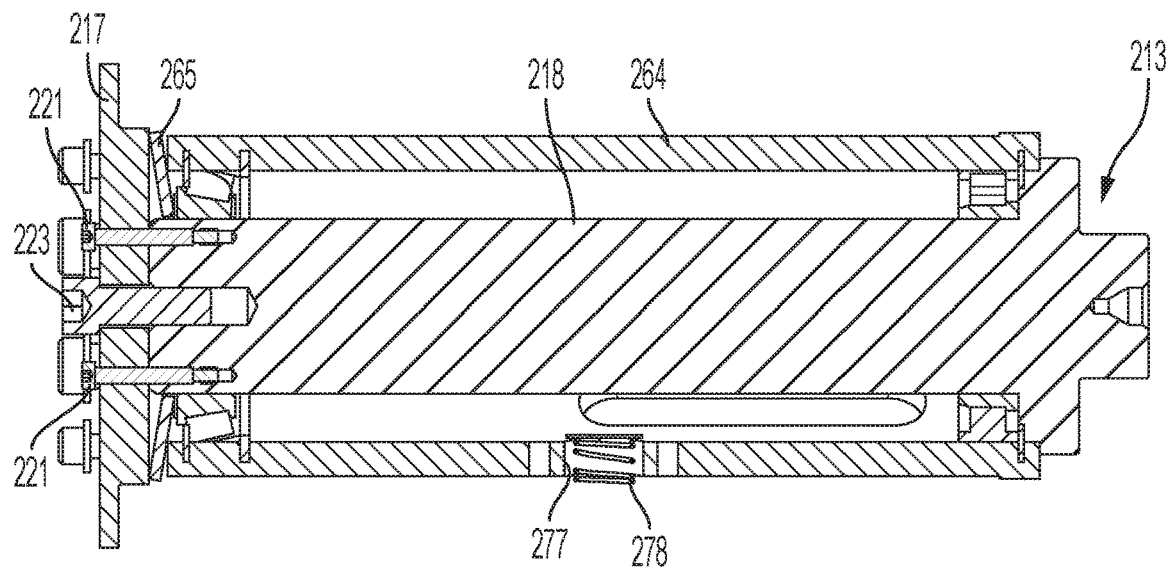
FIG. 11 is a cross sectional view of the axle assembly of the rotator of FIG. 9, along line 11-11.

As shown in FIGS. 9-11, this section describes an illustrative rotator 210. Rotator 210 is another example of a collar flange assembly welding fixture, described above. Many components are similar to those of rotator 110 described in Example A. Accordingly, similar components may be labeled with similar reference numbers.

In FIG. 9, rotator 210 is shown without a flange support structure, but is configured for use with support structures such as flange support structure 116 described above. Rotator 210 includes a stand 212 with a main housing 260 and an axle housing 264. A central axle 218 extends through the stand from a mounting point 213 at a front side of main housing 260 to a handle 214 at a rear side of the housing.

A lifting structure 266 is mounted to a top panel of main housing 260. The lifting structure includes a main extent that is bolted to an underside of the top panel and disposed inside the main housing. Multiple lifting points 267 are bolted to the main extent In the present example, lifting structure 266 includes two lifting points 267. In some examples, the lifting structure may include additional lifting points and/or additional threaded apertures to allow lifting points 267 to be relocated along the length of the main extent. Multiple lifting points and/or adjustable lifting points may allow lifting structure 266 to be configured according to a center of gravity of rotator 210. For example, the center of gravity of the rotator may change when a flange support structure is fastened to mounting point 213. Locating a lifting point above the center of gravity may allow for safer and more stable lifting of the rotator.

Main housing 260 is attached to a base plate 262. Mounted on the base plate is a distance-finding block 263. The block may be used with a laser measurer or other distance finding tool to precisely determine a distance between two rotators. Such precise spacing may allow a precise overall length of a beam and attached collar flange assembly, independent of variations in the beam and/or collar flange assembly. In the depicted example, block 263 is removably mounted to base plate 262 by dowel pins and can be quickly flipped between two orientations.

A front-facing surface of block 263 may be moved a calibrated distance by such a re-orientation. The distance may correspond to a length difference of beams that will be galvanized. For beams that will be galvanized subsequent to attachment of the collar flange assemblies, the assemblies may be machined to allow for the material deposited in the galvanization process. Block 263 may thereby facilitate a quick transition for such beams and/or simplify setup of a welding system.

Rotator 210 also includes a grounding system 274. A conductive rod 275 is mounted to axle housing 264, and extends through an aperture into the housing. Aperture 277 is not shown in FIG. 9, but can be seen in FIG. 11, along with a spring 278. Rod 275 is thereby spring-biased to contact central axle 118. Returning to FIG. 9, a conductive connector 279 is mounted through a side panel of main housing 260. Rod 275 may be electrically connected to connector 279 by a wire or any effective means.

As shown in FIG. 10, a second connector 279 is mounted on an opposing panel of main housing 260. Each connector includes an interface appropriate for connection of a grounding lead such as lead 280. Voltage resulting from welding operations may be thereby allowed to ground safely, without damage to rotator 210. Connectors 279 may provide easy access to grounding system 274 from each side of rotator 210, without the need to access the interior of main housing 260.

Handle 214 includes an outer ring or hoop 215 connected to central plate 217 by four spokes 219. Strength, stiffness, and size of handle 214 are important to allow smooth and safe rotation of heavy structural beams. Spokes 219 are accordingly fastened to central plate 217 with three bolts, arranged in a triangular pattern to improve connection strength. Four shoulder bolts 221 and a central bolt 223 fasten central plate 217 to central axle 218, to eliminate backlash and improve connection strength.

FIG. 11 is a cross-sectional view of the axle mechanism of rotator 210, along line 11-11 in FIG. 9. Central bolt 223 and two of shoulder bolts 221 can also be seen connected to a rear end of central axle 218. Mounting point 213 is disposed at the front end of the axle. In the present example, axle 118 and mounting point 213 are a unitary shaft structure, which may increase strength, simplify manufacturing, and eliminate any risk of breakage of internal welds.

The handle, central plate 217, central axle 118 and any mounted support structure may be fixed together and move together. However, central axle 118 may be allowed a limited range of motion parallel to the axis of rotation. Mounted between central plate 217 and axle housing 264 is a flexible mechanism 265. In the present example, the flexible mechanism 265 includes a Belleville washer. In some examples, the mechanism may include springs, compressible materials, and/or any appropriate structure.

The axle may be biased by the flexible mechanism to return to a default, nominal, neutral, or resting position. As a weld between a collar flange assembly and a beam cools and shrinks, axle 218 may be pulled forward against the spring bias. Once the beam is removed, the axle may return to the resting position. In some examples, the resting position may correspond to a length slightly greater than a desired final beam length, to account for such shrinkage.

C. Illustrative Method of Welding a Collar Flange Assembly to a Beam

Figure 12:
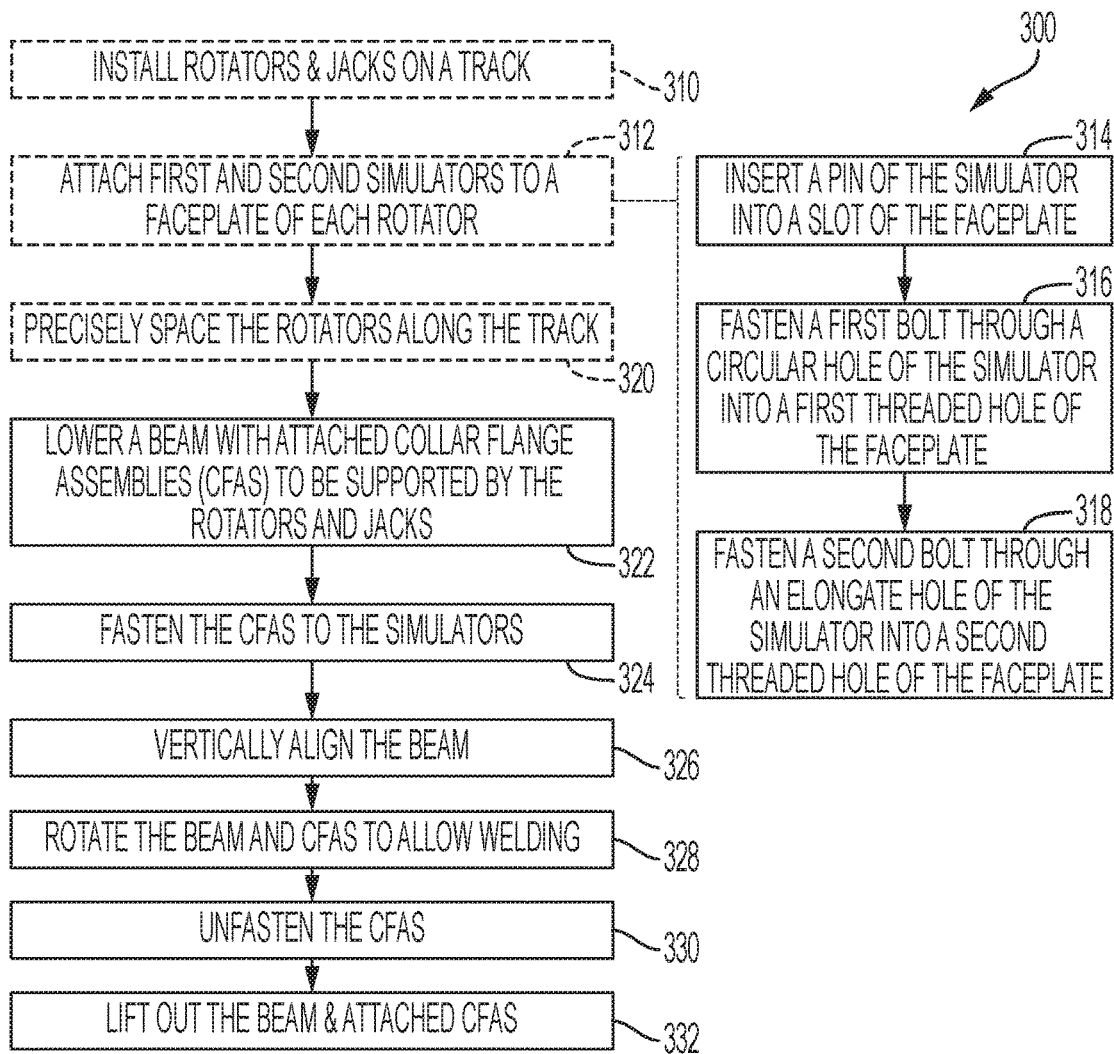
FIG. 12 is a flow chart depicting steps of an illustrative method for welding a collar flange assembly to a beam, according to the present teachings.

This section describes steps of an illustrative method for welding a collar flange assembly to a beam; see FIG. 12. Aspects of welding systems, mounting stations, welding fixtures, and/or rotators described above may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 300 are described below and depicted in FIG. 12, the steps need not necessarily all be performed, and in some cases may be performed simultaneously or in a different order than the order shown.

Optional step 310 of the method includes installing rotators and beam jacks onto a track. The track may be a base structure including one or more channels, configured to allow two rotators and two beam jacks to slide relative to one another. The rotators may be interchanged according to a type of full moment collar, a class of beams, and/or any relevant aspect of a manufacturing project. The rotators may also be interchanged for maintenance purposes and/or replaced with upgraded rotators. Each rotator may include a static and/or adjustable lifting point to allow transport of the rotator with an overhead crane or other lifting equipment.

In some examples, one rotator and one beam jack may be permanently fixed to the track, while the other rotator and beam jack may be adjustable to a desired location. In some examples, additional and/or alternative structures such as distance finding equipment and/or other beam supports may also be installed on the track.

Optional step 312 of the method includes attaching first and second collar corner simulators to a faceplate of each rotator. The faceplate may be connected to a central axle of the rotator, and rotated to a default, upright, 12 o'clock, or 0 degree position as depicted in FIG. 1. A release handle of the rotator may be engaged with the faceplate to prevent rotation during attachment of the simulators.

The collar corner simulators may be selected and/or configured to have a length corresponding to a depth of the beam and collar flange assemblies which are to be welded. The collar corner simulators may be fastened to the faceplate such that they are precisely positioned relative to the faceplate and relative to each other, along X, Y, and Z axes. Substeps 314 through 318 may be performed for each simulator and/or simulator section, to fasten the simulators to the faceplate.

Substep 314 includes inserting a pin of the simulator into a slot of the faceplate. The simulator may include multiple pins, and each pin may be inserted into a corresponding one of a selected subset of a plurality of slots of the faceplate. The selected slots may correspond to a desired configuration of the simulator and may be selected using guide markings on the faceplate. The pins may precisely locate the simulator relative to the faceplate in a vertical direction or along a Z-axis, without constraining the simulator section in a horizontal plane.

Substep 316 includes fastening a bolt through an elongate hole of the simulator into a first threaded hole of the faceplate. A bolt may be inserted through each of multiple elongate apertures of the simulator and threaded into a corresponding one of a selected subset of plurality of threaded holes of the faceplate. The selected holes may correspond to a desired configuration of the simulator and may be selected using guide markings on the faceplate. These bolts may precisely locate the simulator relative to the faceplate in a first horizontal direction or along a Y-axis, without further constraining the simulator section along the Z-axis. These bolts may be left loose temporarily to avoid constraining the simulator section in a second horizontal direction, or along an X-axis.

Substep 318 includes fastening a second bolt through a circular hole of the simulator into a second threaded hole of the faceplate. The circular hole may extend through the simulator in a direction perpendicular to the extent of the elongate hole of the simulator. Similarly, the second threaded hole of the faceplate may extend perpendicular to the first threaded hole of the faceplate.

A bolt may be inserted through each of multiple circular apertures of the simulator and threaded into a corresponding one of a selected subset of a plurality of threaded apertures of the faceplate. The selected apertures may correspond to a desired configuration of the simulator and may selected using guide markings the faceplate. These bolts may be tightened to precisely locate the section of the collar corner relative to the faceplate along the X-axis. The bolts inserted through the elongate apertures of the simulator may subsequently also be tightened. In some examples, other sequences of fastening, or combinations of fasteners may be used. Any effective method of connecting the collar corner simulator to the faceplate precisely without over-constraint may be used.

Optional step 320 of method 300 includes precisely spacing the rotators along the track. The rotators may be secured at a selected distance from one another, the distance corresponding to a beam length. One or both of the rotators may include a distance measuring device, such as a laser distance measurer. Additionally or alternatively, the track may include guide markings indicating a plurality of common distances.

In some examples, the rotators may be securable at a discrete plurality of locations along the track corresponding to selected distance. For instance, a pin may be received through a housing of the rotator into an aperture of the track. In some examples, the rotators may be securable at a continuous plurality of locations to allow any desired spacing. For instance, a clamping bolt of the rotator may be configured to frictionally engage the track.

In some examples, optional steps 310, 312, and/or 320 may be omitted. For example, a rotator may be used to weld collar flange assemblies to multiple beams with identical specifications. In such examples, the welding system may be prepared by performing steps 310, 312, and/or 320 once, and method 300 may subsequently be repeated without some or all of the optional steps.

Step 322 of the method includes lowering a beam with attached collar flange assemblies, to be supported by the rotators and beam jacks. A collar flange assembly may be clamped or otherwise temporarily secured at each end of the beam. The beam may be lowered into the mounting station such that the collar flange assemblies are received by the flange support structures of the rotators and the beam is supported on the beam jacks. In some examples, each collar flange assembly may be separately loaded into the flange support structure of a rotator and the beam may be separately lowered onto the beam jacks. Loading the beam and collar flange assemblies together may precisely locate the beam in a horizontal plane, by the interaction of the collar flange assemblies and the flange support structures of the rotators.

Step 324 includes fastening the collar flange assemblies to the simulators of the flange support structures. Vertical stops of each flange support may hold the collar flange assemblies in place while bolts and/or alignment pins are inserted through aligned apertures in the collar flange assemblies and the collar corner simulators. In some examples, all apertures may be secured or some subset of apertures may be secured. A key may also be inserted into a safety latch mechanism on each rotator to further secure the collar flange assemblies.

Once the collar flange assemblies are secured, clamps and/or other connections between the flange assemblies and the beam may be removed. Step 326 includes vertically aligning the beam. The beam jacks may be raised or lowered as needed to correctly position the beam relative to the collar flange assemblies. The aligned beam and collar flange assemblies may be tack welded together, such that the beam is supported by the flange assemblies. The jacks may then be removed from the track and/or lowered to provide clearance for rotation of the beam.

At step 328, the beam and collar flange assemblies are rotated to allow welding. The beam and flange assemblies may be permanently welded to one another. During welding, the release handles of the rotators may be pulled to allow rotation of the flange supports. Two workers may be needed to rotate the beam, each worker controlling one of the rotators. The beam may be rotated to 0, 45, 90, 135, 180, 225, 270, and/or 315 degree positions. The change in orientation may allow better access to joins requiring welding and/or position welding surfaces horizontally for best results. Coordination between two welders may allow both collar flange assemblies to be attached at once, for greater efficiency.

During rotation, particularly in the 6 o'clock position, the vertical stops of each flange support structure cannot hold the collar flange assemblies, and therefore the beam, in place. Instead, the bolts through the flange assemblies and collar corner simulators hold the beam securely through any rotation. Additionally, a bottom flange of each collar flange assembly is secured between the safety key, vertical stops, and collar corner simulators in all orientations of the flange support. A beam that is tack welded to the collar flange assemblies is therefore secure even when upside-down and un-bolted, reducing the possibility for accidents during rotation.

Upon completion of welding, the beam and flange support structures are returned to the 12 o'clock position. The safety key can then be removed, and step 330 includes unfastening the collar flange assemblies from the flange support structures.

Step 332 of the method includes lifting the now completed beam and attached collar flange assemblies from the beam mounting station. The beam jacks may first be reinstalled or un-collapsed and then may be used to lift the beam a small distance in a controlled and precise manner. For example, the beam may be lifted an inch and/or until a top edge of each collar flange assembly clears a top edge of each collar corner simulator. Such lifting may ensure that the collar flange assemblies do not cause damage by becoming misaligned in the collar corner simulators and wedging or jamming. If pulled by a high-capacity crane, wedged collar flange assemblies may cause damage to the rotators.

Once the collar flange assemblies are sufficiently clear of the collar corner simulators, an overhead crane may be used to lift the beam entirely free of the welding system. The beam may be delivered to storage and/or a construction site.

Illustrative Combinations and Additional Examples

This section describes additional aspects and features of full moment collar flange assembly welding systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. An apparatus for supporting a collar flange assembly for welding to a beam end, comprising:
a faceplate, and
a pair of collar corner simulators attached to the faceplate configured to support top and bottom collar flange members, wherein each collar corner simulator has a pin that fits into a first slot in the faceplate, the first slot having a long axis orthogonal to a long axis of the faceplate.

A1. The apparatus of A, wherein each collar corner simulator also has a hole horizontally adjacent the pin for receiving a bolt to fasten the simulator to the base plate.

A2. The apparatus of A or A1, wherein each collar corner simulator has a second slot configured to receive a bolt for fastening the simulator to the faceplate, the second slot having a long axis orthogonal to the long axis of the first slot.

B. An apparatus for supporting a collar flange assembly for welding to a beam end, comprising:
a faceplate having an array of pins and slots for attaching a collar corner simulator having a stop member extending outward from a lower end portion for setting a proper Z-axis location of a lower flange member.

C. A method of positioning a collar corner simulator on a rotatable baseplate, comprising:
setting the Z-axis location of a collar corner simulator by inserting a pin on the simulator into an oblong hole in the baseplate, the oblong hole having a long axis orthogonal to a long axis of the baseplate.

C1. The method of C, further comprising:
setting X- or Y-axis location of the collar corner simulator by fastening a bolt through a round hole in the simulator to a threaded hole in the baseplate.

C2. The method of C or C1, further comprising: setting X- or Y-axis location of the collar corner simulator by fastening a bolt through an oblong hole in the simulator to a threaded hole in the baseplate, the oblong hole in the simulator having a long axis parallel to the long axis of the baseplate.

D. An apparatus for supporting a collar flange assembly for welding to a beam end, comprising:
a base housing including a horizontal axle mechanism,
a faceplate configured for attachment to the axle mechanism, and
a pair of collar corner simulators attached to the faceplate configured to support top and bottom collar flange members, wherein the housing contains a grounding conductor accessible from two opposite sides of the housing for providing a ground during a welding procedure.

D1. The apparatus of D, wherein the grounding conductor includes a plate that is electrically connected to the faceplate, and the housing has an access hole on each of the two opposite sides for access to the plate of the grounding conductor.

E. An apparatus for supporting a collar flange assembly for welding to a beam end, comprising:
a base housing including a horizontal axle mechanism,
a faceplate configured for attachment to the axle mechanism, and
a pair of collar corner simulators attached to the faceplate configured to support top and bottom collar flange members, wherein the housing has a bumper on an external surface between the housing and the faceplate.

F. An apparatus for supporting a collar flange assembly for welding to a beam end, comprising:
a base housing including a horizontal axle mechanism,
a faceplate configured for attachment to the axle mechanism, and a pair of collar corner simulators attached to the faceplate configured to support top and bottom collar flange members, wherein the faceplate is removable from the axle mechanism and has a connection feature for connecting to a lifting apparatus.

G. An apparatus for supporting a collar flange assembly for welding to a beam end, comprising:
a base housing including a horizontal axle mechanism,
a faceplate configured for attachment to the axle mechanism,
a pair of collar corner simulators attached to the faceplate configured to support top and bottom collar flange members, and
a handle connected to the axle mechanism, the handle being mounted on a side of the housing opposite from the faceplate.

H. An apparatus for supporting a collar flange assembly for welding to a beam end, comprising:
a base housing including a horizontal axle mechanism,
a faceplate configured for attachment to the axle mechanism,
a pair of collar corner simulators attached to the faceplate configured to support top and bottom collar flange members, and
a safety latch mounted on one of the collar corner simulators configured to alternate between a locked mode and a free rotation mode, the axle mechanism being prevented from rotating in the locked mode, and free to rotate in the free rotation mode.

H1. The apparatus of H, wherein the safety latch requires a key to be inserted for enabling the free rotation mode.

H2. The apparatus of H1, wherein the key cannot be removed when the axle mechanism is in the free rotation mode.

J. A beam-end component welding fixture, comprising:
a stand including a central horizontal axle mechanism and a housing;
a handle mounted on a first end portion of the axle mechanism;
a rotatable plate structure mounted on a second end portion of the axle mechanism; and
a column connecting simulator attached to the plate structure and configured to support a beam-end component.

J1. The welding fixture of J, wherein the plate structure and the handle are disposed on opposite sides of the housing.

J2. The welding fixture of J or J1, wherein the handle includes a wheel connected to the axle mechanism via spoke structures.

J3. The welding fixture of any of J-J2, wherein the beam-end component is a collar-flange assembly, and the column connecting simulator includes a pair of collar corner simulators J4. The welding fixture of J3, wherein at least one of the simulators has a hole and a removeable stop member engaging the hole to prevent inadvertent removal of a collar flange assembly from the simulators.

J5. The welding fixture of J4, wherein the plate structure is prevented from rotating when the stop member is not engaged in the hole.

J6. The welding fixture of J5, further comprising:
a back-up lock device preventing rotation of the plate structure, and removal of the stop member from the hole until the back-up lock device is unlocked.

J7. The welding fixture of any of J3-J6, further including a safety latch mechanism mounted on one of the pair of collar corner simulators, the latch mechanism being configured to engage a latch plate of the housing to prevent rotation of the axle mechanism.

J8. The welding fixture of J7, wherein the safety latch mechanism includes a key configured to disengage the latch mechanism from the latch plate and allow rotation of the axle mechanism, and to act as a stop to prevent removal of collar flange assembly from the simulators when the key is engaged with the safety latch mechanism.

J9. The welding fixture of any of J3-J8, wherein the plate structure includes an array of circular apertures and elongate slots for fastening the pair of collar corner simulators to the plate structure.

J10. The welding fixture of J9, wherein each circular aperture is a threaded aperture configured to receive a bolt, and each elongate aperture is a slot configured to receive a pin of a collar corner simulator.

J11. The welding fixture of any of J3-J10, wherein each collar corner simulator includes a stop member extending outward from a lower end portion for setting a precise vertical location of a collar flange assembly.

J12. The welding fixture of J11, wherein the stop member includes a guiding shoulder surface for setting a precise horizontal location of the collar flange assembly.

J13. The welding fixture of any of J-J12, further including a bumper disposed between the housing and the plate structure.

J14. The welding fixture of any of J-J13, wherein the housing includes a lifting flange having an aperture configured for connection to a lifting apparatus.

J15. The welding fixture of any of J-J14, wherein the plate structure includes an aperture configured for connection to a lifting apparatus.

J16. The welding fixture of any of J-J15, further including a grounding conductor accessible from first and second opposite sides of the housing, for providing ground away from the axle mechanism during a welding procedure.

J17. The welding fixture of any of J-J16, wherein the axle mechanism allows a limited horizontal displacement of the plate structure and is spring biased to return the plate structure to a resting position.

J18. The welding fixture of any of J-J17, wherein the axle mechanism includes a unitary axle shaft that is directly connected to the plate structure.

K. A collar flange assembly welding system, comprising:
a base including a track; and
first and second collar flange assembly welding fixtures slidably mounted on the track, each welding fixture including:
a stand including a central horizontal axle mechanism and a housing;
a handle mounted on a first end of the axle mechanism;
a rotatable plate structure mounted on a second end of the axle mechanism; and
a pair of collar corner simulators attached to the plate structure and configured to support a collar flange assembly.

K1. The welding system of K, wherein at least one of the welding fixtures includes a laser distance finding tool configured to measure a distance between the first and second welding fixtures.

K2. The welding system of K or K1, wherein the handle includes a circular gripping structure having a diameter at least approximately equal to a height of the housing.

K3. The welding system of any of K-K2, wherein the housing of each welding fixture includes a lifting flange configured for connection to a lifting apparatus.

K4. The welding system of any of K-K3, wherein the plate structure and the handle of each welding fixture are disposed on opposite sides of the housing.

L. A method of welding a beam-end component to an end of a beam, comprising:
- positioning a first welding fixture a selected distance from a second welding fixture along a track;
- mounting a rotatable plate structure to a first end of a horizontal axle mechanism of the first welding fixture;
- positioning a column connecting simulator on the rotatable plate structure;
- engaging beam-end component in the simulator;
- supporting a beam between the first and second welding fixtures, such that an end of the beam is adjacent the beam-end component;
- rotating the beam-end component and the beam with a handle mounted to a second end of the horizontal axle mechanism of each of the first and second welding fixtures;
- welding the beam-end component to the end of the beam.

L1. The method of L, wherein the beam-end component is a collar flange assembly and the column connecting simulator includes a pair of collar corner simulators.

L2. The method of L1, wherein positioning the pair of collar corner simulators includes setting a Z-axis location of each collar corner simulator by inserting a pin on the simulator into an oblong hole in the plate structure, the oblong hole having a long axis orthogonal to a long axis of the plate structure.

L3. The method of L2, wherein positioning the pair of collar corner simulators includes setting an X-axis location of each collar corner simulator by fastening a bolt through a round hole in the simulator to a first threaded hole in the plate structure.

L4. The method of L3, wherein positioning the pair of collar corner simulators includes setting a Y-axis location of each collar corner simulator by fastening a bolt through an oblong hole in the simulator to a second threaded hole in the plate structure, the oblong hole in the simulator having a long axis parallel to the long axis of the plate structure.

Advantages, Features, and Benefits

The different examples of the collar flange assembly welding fixture described herein provide several advantages over known solutions for welding collar flange assemblies to beams. For example, illustrative examples described herein allow precise positioning of the collar flange assembly relative to the beam throughout welding.

Additionally, and among other benefits, illustrative examples described herein allow rotation of the collar flange assembly and the beam for improved welding access, while maintaining positioning.

Additionally, and among other benefits, illustrative examples described herein include a redundant safety latch to prevent accidental rotation of an unsecured collar flange assembly.

Additionally, and among other benefits, illustrative examples described herein allow reconfiguration for use in manufacture of a variety of styles and sizes of collar flange assembly.

Additionally, and among other benefits, illustrative examples described herein include a rotation handle allowing operation from a safe position.

Additionally, and among other benefits, illustrative examples described herein reduce risk of damage to system components due to jamming of beams during removal.

Additionally, and among other benefits, illustrative examples described herein account for length variations due to thermal contraction.

No known system or device can perform these functions, particularly in with such safety and ease of use. Thus, the illustrative examples described herein are particularly useful for large scale precision manufacture of full-moment collars. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A beam-end component welding fixture, comprising:
   - a stand including a central horizontal axle mechanism and a housing;
   - a handle mounted on a first end portion of the axle mechanism;
   - a rotatable plate structure mounted on a second end portion of the axle mechanism; and
   - a column connecting simulator attached to the plate structure, including a pair of collar corner simulators, and configured to support a collar flange assembly;
   - wherein each collar corner simulator includes a stop member extending outward from a lower end portion for setting a precise vertical location of the collar flange assembly.

2. The welding fixture of claim 1, wherein the plate structure and the handle are disposed on opposite sides of the housing.

3. The welding fixture of claim 1, wherein the handle includes a wheel connected to the axle mechanism via spoke structures.

4. The welding fixture of claim 1, wherein at least one of the simulators has a hole and a removeable stop member engaging the hole to prevent inadvertent removal of a collar flange assembly from the simulators.

5. The welding fixture of claim 4, wherein the plate structure is prevented from rotating when the stop member is not engaged in the hole.

6. The welding fixture of claim 5, further comprising:
   - a back-up lock device preventing rotation of the plate structure, and removal of the stop member from the hole until the back-up lock device is unlocked.

7. The welding fixture of claim 1, further including a safety latch mechanism mounted on one of the pair of collar corner simulators, the latch mechanism being configured to engage a latch plate of the housing to prevent rotation of the axle mechanism.

8. The welding fixture of claim 7, wherein the safety latch mechanism includes a key configured to disengage the latch mechanism from the latch plate and allow rotation of the axle mechanism, and to act as a stop to prevent removal of a collar flange assembly from the simulators when the key is engaged with the safety latch mechanism.

9. The welding fixture of claim 1, wherein the plate structure includes an array of circular apertures and elongate slots for fastening the pair of collar corner simulators to the plate structure.

10. The welding fixture of claim 9, wherein each circular aperture is a threaded aperture configured to receive a bolt, and each elongate aperture is a slot configured to receive a pin of a collar corner simulator.

11. The welding fixture of claim 1, wherein the stop member includes a guiding shoulder surface for setting a precise horizontal location of the collar flange assembly.

12. The welding fixture of claim 1, further including a grounding conductor accessible from first and second opposite sides of the housing, for providing ground away from the axle mechanism during a welding procedure.

13. The welding fixture of claim 1, wherein the axle mechanism allows a limited horizontal displacement of the plate structure and is spring biased to return the plate structure to a resting position.

14. A beam-end component welding fixture, comprising:
 a stand including a central horizontal axle mechanism and a housing;
 a handle mounted on a first end portion of the axle mechanism;
 a rotatable plate structure mounted on a second end portion of the axle mechanism; and
 a column connecting simulator attached to the plate structure, including a pair of collar corner simulators, and configured to support a collar flange assembly;
 wherein at least one of the simulators has a hole and a removeable stop member engaging the hole to prevent inadvertent removal of a collar flange assembly from the simulators.

15. The welding fixture of claim 14, wherein the plate structure is prevented from rotating when the stop member is not engaged in the hole.

16. The welding fixture of claim 15, further comprising:
 a back-up lock device preventing rotation of the plate structure, and removal of the stop member from the hole until the back-up lock device is unlocked.

17. The welding fixture of claim 14, further including a bumper disposed between the housing and the plate structure.

18. The welding fixture of claim 14, wherein the axle mechanism allows a limited horizontal displacement of the plate structure and is spring biased to return the plate structure to a resting position.

19. Welding fixture of claim 14, wherein the axle mechanism includes a unitary axle shaft that is directly connected to the plate structure.

20. A beam-end component welding fixture, comprising:
 a stand including a central horizontal axle mechanism and a housing;
 a handle mounted on a first end portion of the axle mechanism;
 a rotatable plate structure mounted on a second end portion of the axle mechanism; and
 a column connecting simulator attached to the plate structure, including a pair of collar corner simulators, and configured to support a collar flange assembly;
 wherein the plate structure includes an array of circular apertures and elongate slots for fastening the pair of collar corner simulators to the plate structure.

21. The welding fixture of claim 20, wherein each circular aperture is a threaded aperture configured to receive a bolt, and each elongate aperture is a slot configured to receive a pin of a collar corner simulator.

* * * * *